(12) United States Patent
Hong et al.

(10) Patent No.: US 7,936,655 B2
(45) Date of Patent: May 3, 2011

(54) READ CIRCUIT OF A DISK DRIVE SYSTEM AND METHOD OF SIGNAL PROCESSING THEREOF

(75) Inventors: Ju-Hyung Hong, Gyeonggi-do (KR); Il-Won Seo, Gyeonggi-do (KR); Hyun-Wook Lim, Gyeonggi-do (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 836 days.

(21) Appl. No.: 11/782,012

(22) Filed: Jul. 24, 2007

(65) Prior Publication Data

US 2008/0031114 A1 Feb. 7, 2008

(30) Foreign Application Priority Data

Aug. 1, 2006 (KR) .................. 10-2006-0072731

(51) Int. Cl.
G11B 7/00 (2006.01)

(52) U.S. Cl. ................ 369/53.35; 369/59.22; 369/53.33

(58) Field of Classification Search ................ 369/53.35
See application file for complete search history.

(56) References Cited

U.S. PATENT DOCUMENTS

| | | | |
|---|---|---|---|
| 5,949,831 A | 9/1999 | Coker et al. | |
| 6,009,448 A | 12/1999 | Jong et al. | |
| 6,185,173 B1 | 2/2001 | Livingston et al. | |
| 6,427,220 B1 * | 7/2002 | Vityaev | 714/781 |
| 6,931,585 B1 | 8/2005 | Burd et al. | |
| 7,155,660 B1 * | 12/2006 | Burd | 714/795 |
| 7,571,372 B1 * | 8/2009 | Burd et al. | 714/769 |
| 2003/0067998 A1 * | 4/2003 | Nakajima et al. | 375/341 |
| 2006/0044990 A1 * | 3/2006 | Kawabe et al. | 369/124.14 |

FOREIGN PATENT DOCUMENTS

| | | |
|---|---|---|
| JP | 2004-134062 | 4/2004 |
| KR | 2005-26320 | 3/2005 |

OTHER PUBLICATIONS

Roy D. Cideciyan et al., "Noise Predictive Maximum Likelihood Detection Combined with Parity-Based Post-Processing", IEEE Transactions on Magnetics, vol. 37, No. 2, Mar. 2001.
Aleksander Kavcic and Jose M. F. Moura, "The Viterbi Algorithm and Markov Noise Memory", IEEE Transactions on Information Theory, vol. 46, No. 1, Jan. 2000.

* cited by examiner

*Primary Examiner* — Lixi Chow
(74) *Attorney, Agent, or Firm* — Stanzione & Kim, LLP (57) ABSTRACT

A read circuit of a disk drive system that adaptively reduces signal-dependent noise including a sequence detector, a signal-dependent adaptive engine and a signal-dependent post-processor. The sequence detector recovers a data sequence from equalized data. The signal-dependent adaptive engine generates signal-dependent coefficients, a mean value and a standard deviation of a signal-dependent error. The signal-dependent post-processor corrects the signal-dependent error.

18 Claims, 6 Drawing Sheets

READ CIRCUIT OF A DISK DRIVE SYSTEM AND METHOD OF SIGNAL PROCESSING THEREOF

CROSS-REFERENCE TO RELATED APPLICATIONS

This application claims priority under 35 USC §119 from Korean Patent Application No. 2006-72731, filed on Aug. 1, 2006 in the Korean Intellectual Property Office (KIPO), the disclosure of which is incorporated herein in its entirety by reference.

BACKGROUND OF THE INVENTION

1. Field of the Invention

The present general inventive concept relates to a disk drive system, and more particularly to a read circuit of a disk drive system and a method of signal processing of the read circuit.

2. Description of the Related Art

A hard disk drive (HDD) is used as a standard data storage device in a computer system. The HDD has been widely used as a data storage device because manufacturing costs are low, storage capacity is large, power dissipation is low, and the speed of data transmission is fast.

The disk drive system includes at least one rotating magnetic platter and many devices for reading and writing data to and from the rotating magnetic platters. A read/write head is located over the rotating magnetic platters. A disk drive circuit is coupled to the read/write head, and controls a position of the read/write head and generates and senses an electromagnetic field that represents data to be read and to be written. The disk drive circuit receives data from a host device, such as a personal computer (PC), and transforms the data into magnetic codes. The read/write head writes the magnetic codes on the rotating magnetic platters. Further, when a host device requests data from the disk drive system, the disk drive circuit searches for locations of data to be read, senses magnetic codes that represent the data, and transforms the magnetic codes into binary digital information. The disk drive circuit may include an algorithm for error detection and error correction.

As the density and rotation speed of the magnetic platters are increased, a data processing technology referred to as Partial Response Maximum Likelihood (PRML) has been developed in order to solve the problems related to peak detection. PRML adopts an algorithm that is implemented in the disk drive system in order to interpret magnetic signals that are sensed by the read/write head.

The disk drive system based on PRML reads waveforms of analog signals generated by magnetic flux reversals that are stored on the disk platters. The disk drive system based on PRML does not search for peak values to represent the magnetic flux reversals. The disk drive system, however, digitally samples a waveform of an analog signal (partial response), and determines bit patterns for the waveform (maximum likelihood). The PRML technology is insensitive to noise that may be included in the detected magnetic signals. Therefore, even a platter of low quality may be used and manufacturing yield may be increased, and manufacturing costs may be decreased.

In general, a read circuit of a disk drive system may include a sequence detector for recovering a data sequence from equalized data to generate recovered data, and a signal-dependent post-processor for correcting a signal-dependent error included in the recovered data.

In the disk drive system, there may exist unwanted noise components such as additive white Gaussian noise (AWGN), media noise, signal-dependent noise and magnetoresistive (MR) asymmetric noise. Among the noise components, the signal-dependent noise, which is non-linear noise, is not fully eliminated.

Nowadays, research is conducted on eliminating the signal-dependent noise. A technology for reducing non-linear noise included in an output data of a Viterbi detector using an error event filter is disclosed in U.S. Pat. No. 5,949,831. However, error correction using the method described in U.S. Pat. No. 5,949,831 has limits such that the method finds an error type depending only on the error event filter.

According to a technology disclosed in the paper entitled, "Noise predictive maximum likelihood detection combined with parity-based post-processing," IEEE Trans. Magnetics, Vol. 37, No. 2, March 2001, a dominant error event may be corrected by including a parity-based post-processor.

According to a technology disclosed in U.S. Pat. No. 6,427,220, a post-processor based on cyclic redundancy checking (CRC) may accurately detect positions of errors using CRC codes.

According to a technology disclosed in U.S. Pat. No. 6,931,585, an accurate value of a maximum likelihood distance penalty (MLDP) is obtained using an accumulation of branch metric (BM) values. However, the technology disclosed in U.S. Pat. No. 6,931,585 may require a large memory capacity for storing parameters as media density is increased.

However, a conventional method of signal processing cannot adaptively decrease signal-dependent noise according to media characteristics.

SUMMARY OF THE INVENTION

Accordingly, the present general inventive concept is provided to substantially obviate one or more problems due to limitations and disadvantages of the related art.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing a read circuit of a disk drive system that may adaptively reduce signal-dependent noise according to media characteristics.

The foregoing and/or other aspects and utilities of the present general inventive concept may also be achieved by providing an adaptive post-processor that may adaptively reduce signal-dependent noise according to media characteristics.

The foregoing and/or other aspects and utilities of the present general inventive concept may also be achieved by providing a method of signal processing of a read circuit that may adaptively reduce signal-dependent noise according to media characteristics.

The read circuit of a disk drive system may include a sequence detector, a signal-dependent adaptive engine and a signal-dependent post-processor.

The sequence detector may recover a data sequence from equalized data to generate recovered data. The signal-dependent adaptive engine may generate a plurality of signal-dependent coefficients, a mean value of a signal-dependent error, and a standard deviation of the signal-dependent error based on the equalized data and the recovered data. The signal-dependent post-processor may correct the signal-dependent error included in the recovered data to generate first data based on the recovered data, the signal-dependent coefficients, the mean value of the signal-dependent error, and the standard deviation of the signal-dependent error.

The signal-dependent adaptive engine may generate the signal-dependent coefficients, the mean value of the signal-dependent error, and the standard deviation of the signal-dependent error using a least mean square (LMS) engine.

The signal-dependent adaptive engine may include an adder, a filter, a plurality of delay units and a plurality of filter taps.

The adder may subtract the recovered data from the equalized data to generate an error signal. The filter may generate the signal-dependent error based on the error signal and the signal-dependent coefficients. The plurality of delay units that are cascade-coupled to each other may delay the error signal. The plurality of filter taps may multiply the error signal and an output signal of each of the delay units by the signal-dependent error, and may accumulate the multiplied results to generate the signal-dependent coefficients.

The signal-dependent adaptive engine may further include a calculating unit that generates the mean value of a signal-dependent error and the standard deviation of the signal-dependent error based on the signal-dependent error and the signal-dependent coefficients.

The signal-dependent post-processor may include a signal-dependent error event filter, a maximum likelihood distance penalty (MLDP) calculating unit, a parity calculating unit, an error detecting unit and an error correcting unit.

The signal-dependent error event filter may generate a signal-dependent error event based on the recovered data and the signal-dependent coefficients. The MLDP calculating unit may calculate an MLDP based on the signal-dependent error event, the standard deviation of the signal-dependent error and the mean value of the signal-dependent error. The parity calculating unit may calculate a parity based on the recovered data. The error detecting unit may detect an error event having a minimum value of the MLDP based on the MLDP and the parity. The error correcting unit may correct errors included in the recovered data based on the recovered data and the error event having the minimum value of the MLDP.

The read circuit of a disk drive system may further include an analog front end, an analog-to-digital converter (ADC) and a digital front end.

The analog front end may amplify, filter and buffer an output signal of a pre-amplifier. The ADC may sample an output signal of the analog front end and may convert the sampled signal into a first signal having a digital form. The digital front end may perform a partial-response pulse shaping on the first signal to generate the equalized data.

The digital front end may include an equalizer.

The adaptive post-processor may include a signal-dependent adaptive engine and a signal-dependent post-processor.

The signal-dependent adaptive engine may generate a plurality of signal-dependent coefficients, a mean value of a signal-dependent error, and a standard deviation of the signal-dependent error based on equalized data and recovered data. The signal-dependent post-processor may correct the signal-dependent error included in the recovered data to generate error-corrected data based on the recovered data, the signal-dependent coefficients, the mean value of the signal-dependent error, and the standard deviation of the signal-dependent error.

The signal-dependent adaptive engine may generate the signal-dependent coefficients, the mean value of the signal-dependent error, and the standard deviation of the signal-dependent error using an LMS engine.

The error correcting circuit may include a sequence detector, a signal-dependent adaptive engine and a signal-dependent post-processor.

The sequence detector may recover a data sequence from equalized data to generate recovered data. The signal-dependent adaptive engine may generate a plurality of signal-dependent coefficients, a mean value of a signal-dependent error, and a standard deviation of the signal-dependent error based on the equalized data and the recovered data. The signal-dependent post-processor may correct the signal-dependent error included in the recovered data to generate first data based on the recovered data, the signal-dependent coefficients, the mean value of the signal-dependent error, and the standard deviation of the signal-dependent error.

The foregoing and/or other aspects and utilities of the present general inventive concept may also be achieved by providing a method of signal processing of a read circuit includes recovering a data sequence from equalized data to generate recovered data, generating a plurality of signal-dependent coefficients, a mean value of a signal-dependent error, and a standard deviation of the signal-dependent error based on the equalized data and the recovered data, and correcting the signal-dependent error included in the recovered data to generate first data based on the recovered data, the signal-dependent coefficients, the mean value of the signal-dependent error, and the standard deviation of the signal-dependent error.

The signal-dependent coefficients, the mean value of the signal-dependent error, and the standard deviation of the signal-dependent error may be generated using an LMS engine.

The read circuit of a disk drive system may adaptively reduce signal-dependent noise using a small amount of hardware.

The foregoing and/or other aspects and utilities of the general inventive concept may also be achieved by providing a disk drive system, including one or more magnetic platters, a read/write head unit to read data from and write data to the one or more platters and a read/write unit to receive data from and provide data to the read/write head unit in a manner that signal-dependent noise corresponding to one or more media characteristics is adaptively reduced.

The foregoing and/or other aspects and utilities of the general inventive concept may also be achieved by providing a method of error correcting in a disk drive system, the method including generating one or more signal-dependent coefficients, a mean value of a signal-dependent error and a standard deviation of a signal-dependent error based on recovered data and correcting the signal-dependent error in the recovered data.

The foregoing and/or other aspects and utilities of the general inventive concept may also be achieved by providing a computer-readable recording medium having embodied thereon a computer program to execute a method, wherein the method includes recovering a data sequence from equalized data to generate recovered data, generating a plurality of signal-dependent coefficients, a mean value of a signal-dependent error, and a standard deviation of the signal-dependent error based on the equalized data and the recovered data and correcting the signal-dependent error included in the recovered data to generate first data based on the recovered data, the signal-dependent coefficients, the mean value of the signal-dependent error, and the standard deviation of the signal-dependent error.

The foregoing and/or other aspects and utilities of the general inventive concept may also be achieved by providing a disk drive system, including a read circuit to recover data of a data sequence to generate recovered data, to generate a combination of a signal dependent coefficient, a mean value, a standard deviation according to the recovered data and the data, and to correct a signal dependent error of the data and the recovered data according to the combination of the signal dependent coefficient, mean value, and standard deviation.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the present general inventive concept. As used herein, the term "and/or" includes any and all combinations of one or more of the associated listed items.

It will be understood that when an element is referred to as being "connected" or "coupled" to another element, it can be directly connected or coupled to the element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the present general inventive concept. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, operations, elements, and/or components, but do not preclude the presence or addition of one or more other features, integers, operations, elements, components, and/or groups thereof.

Unless otherwise defined, all terms (including technical and scientific terms) used herein have the same meaning as commonly understood by one of ordinary skill in the art to which this present general inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
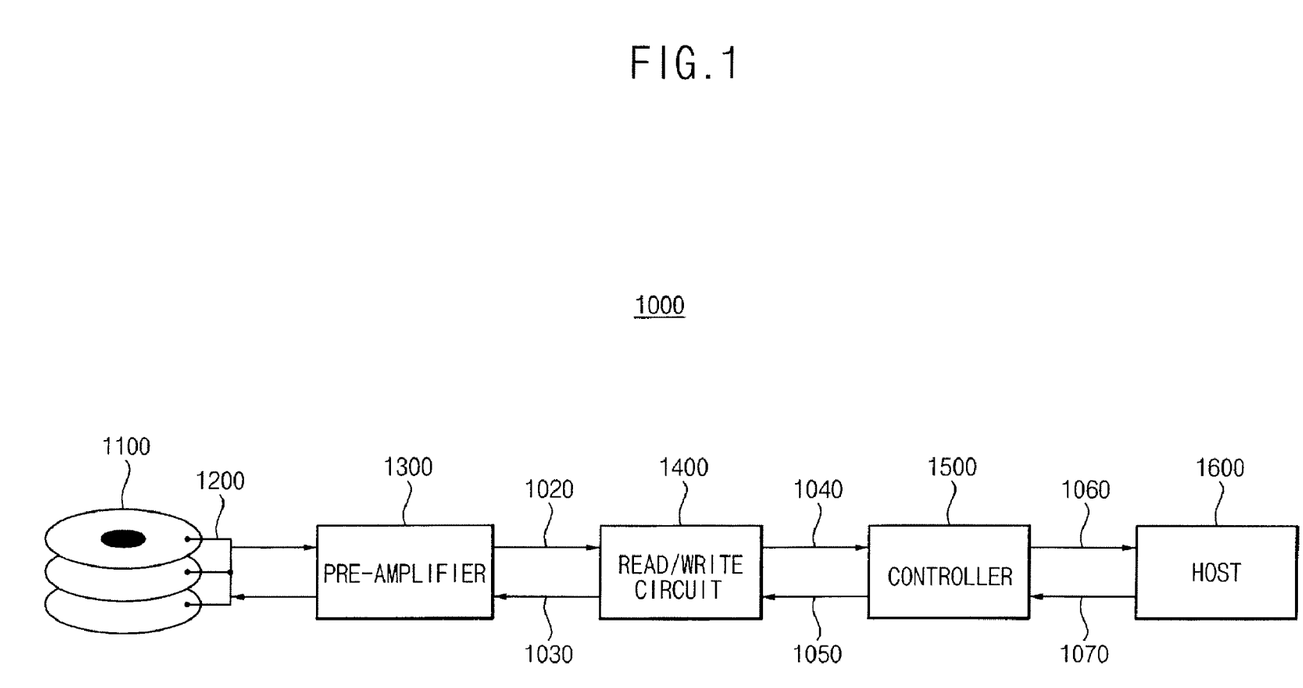
FIG. 1 is a block diagram illustrating a hard disk drive (HDD) system according to an example embodiment of the present general inventive concept.

FIG. 1 is a block diagram illustrating a hard disk drive (HDD) system 1000 according to an example embodiment of the present general inventive concept.

Referring to FIG. 1, the HDD system 1000 includes magnetic platters 1100, a read/write head 1200, a pre-amplifier 1300, a read/write unit such as a read/write circuit 1400 and a controller 1500.

The pre-amplifier 1300 is coupled to the read/write circuit 1400 through interfaces 1020 and 1030. The controller 1500 is coupled to the read/write circuit 1400 through interfaces 1040 and 1050, and coupled to a host 1600 (i.e., a host device) through interfaces 1060 and 1070.

The host 1600 provides addresses, i.e., position identifiers that identify positions of data on the disk composed of the magnetic platters 1100, to the HDD system 1000 in order to read data from the HDD system 1000. The controller 1500 receives the addresses and determines physical positions of data on the magnetic platters 1100. The controller 1500 moves the read/write head 1200 to put the read/write head 1200 to the proper position. The read/write head 1200 senses the existence or non-existence of a flux reversal to generate a stream of analog signals. The pre-amplifier 1300 amplifies the stream of an analog signal and provides the amplified analog signal to the read/write circuit 1400 through the interface 1020.

As described below, the read/write circuit 1400 receives the amplified analog signal and decodes the amplified analog signal to generate binary digital data. The binary digital data is transferred to the controller 1500 through the interface 1040. The controller 1500 interfaces with the host 1600.

In order to write data to the HDD system 1000, the host 1600 provides binary digital data and addresses, into which the binary digital data is written and a position to be written on, to the controller 1500. For example, the addresses may be a position of cylinders and sectors. The controller 1500 moves the read/write head 1200 to put the read/write head 1200 to the proper position. Further, the controller 1500 transfers the binary digital data to be written to the read/write circuit 1400 through the interface 1050. The read/write circuit 1400 receives the binary digital data and encodes the binary digital data to generate analog signals that will be used to drive the read/write head 1200. The analog signals are transferred to the pre-amplifier 1300 through the interface 1030. The pre-amplifier 1300 drives the read/write head 1200 such that the read/write head 1200 provides magnetic flux reversals that represent the binary digital data to the magnetic platters 1100.

Figure 2:
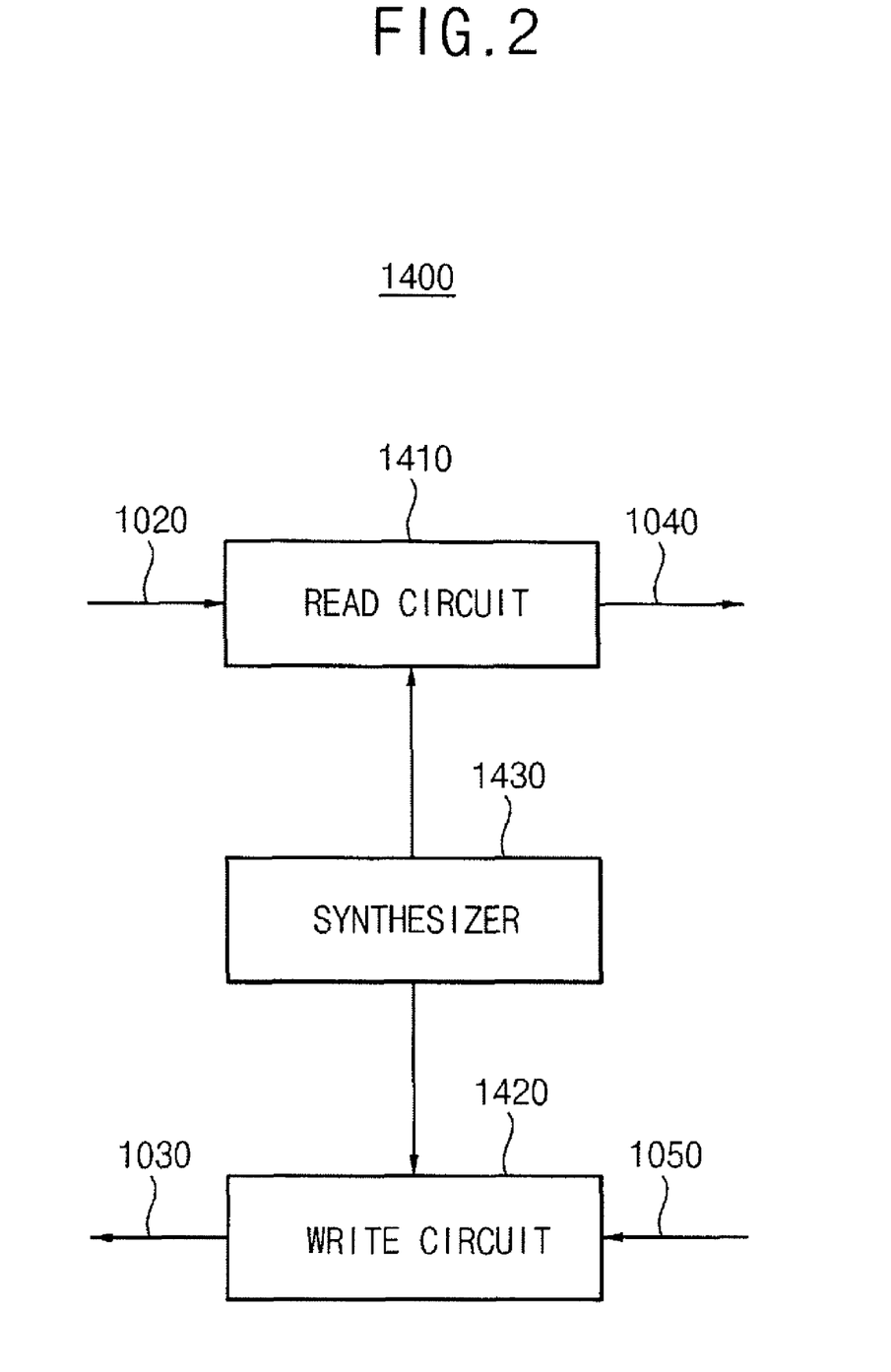
FIG. 2 is a block diagram illustrating an example of a read/write circuit in the HDD system of FIG. 1.

FIG. 2 is a block diagram illustrating an example of the read/write circuit 1400 in the HDD system 1000 of FIG. 1.

Referring to FIG. 2, the read/write circuit 1400 includes a read circuit 1410, a write circuit 1420, and a clock synthesizer 1430.

The read circuit 1410 reads data from the HDD system 1000 to provide the data to the host 1000. The write circuit 1420 receives data from the host 1600 and writes the data to the HDD system 1000. The clock synthesizer 1430 generates a clock signal that is used to operate the read circuit 1410 and the write circuit 1420.

Figure 3:
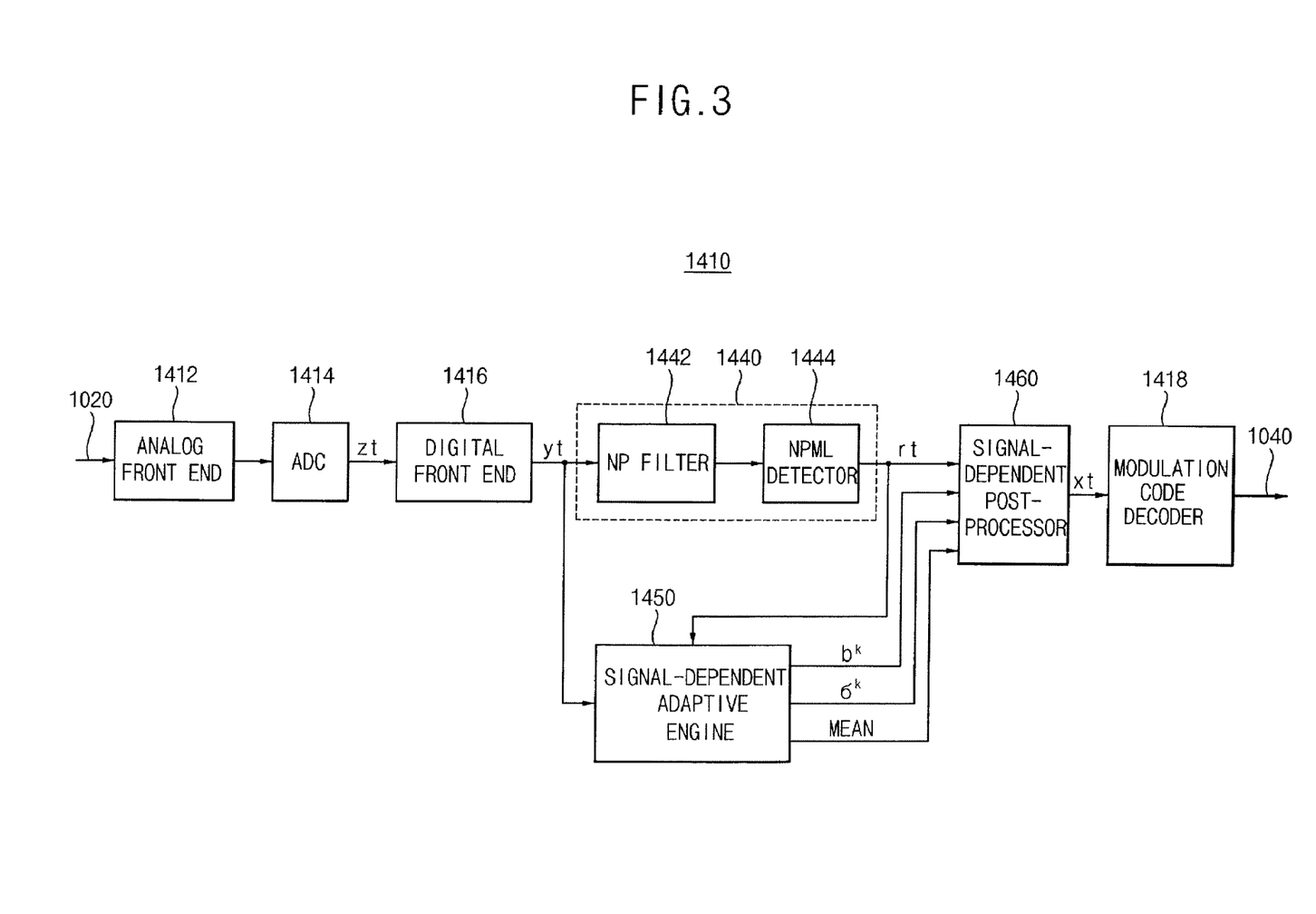
FIG. 3 is a block diagram illustrating an example of a read circuit in the read/write circuit of FIG. 2.

FIG. 3 is a block diagram illustrating an example of the read circuit 1410 in the read/write circuit 1400 of FIG. 2.

Referring to FIG. 3, the read circuit 1410 includes an analog front end 1412, an analog-to-digital converter (ADC) 1414, a digital front end 1416, a sequence detector 1440, a signal-dependent adaptive engine 1450, a signal-dependent post-processor 1460 and a modulation code decoder 1418.

The analog front end 1412 amplifies, filters, and buffers an output signal of the pre-amplifier 1300 illustrated in FIG. 1. The ADC 1414 samples an output signal of the analog front end 1412 and converts the sampled signal into a signal zt having a digital form. The digital front end 1416 is a type of equalizer, and receives the output signal zt of the ADC 1414 and generates equalized data yt. The digital front end 1416 adaptively performs a partial-response (PR) pulse shaping that is suitable for channel characteristics.

The sequence detector 1440 recovers a data sequence from the equalized data yt to generate recovered data rt using a noise-predictive maximum likelihood (NPML) and a state suitable to a partial-response (PR) target.

The signal-dependent adaptive engine 1450 generates a plurality of signal-dependent coefficients bk, a mean value MEAN of a signal-dependent error, and a standard deviation σk of the signal-dependent error based on the equalized data yt and the recovered data rt. The signal-dependent post-processor 1460 corrects the signal-dependent error included in the recovered data rt to generate first data xt based on the recovered data rt, the signal-dependent coefficients bk, the mean value MEAN of the signal-dependent error, and the standard deviation σk of the signal-dependent error. The first data xt is data that is close to target data. The modulation code decoder 1418 decodes the first data xt and provides the decoded data to the controller 1500 illustrated in FIG. 1 through the interface 1040. Run length code (RLC) may be used to decode in the modulation code decoder 1418.

The sequence detector 1440 includes a noise-predictive (NP) filter 1442 and an NPML detector 1444.

The NP filter 1442 transforms colored noise that is included in the equalized data yt, which is an output signal of the digital front end 1416, into white noise. The NP filter 1442 includes a typical filter that does not affect a branch metric (BM) of the NPML detector 1444. The NPML detector 1444 recovers a data sequence from an output signal of the NP filter 1442 to generate the recovered data rt.

NPML technology is described in detail in the paper entitled, "Noise predictive maximum likelihood detection combined with parity-based post-processing," IEEE Trans. Magnetics, Vol. 37, No. 2, March 2001.

Figure 4:
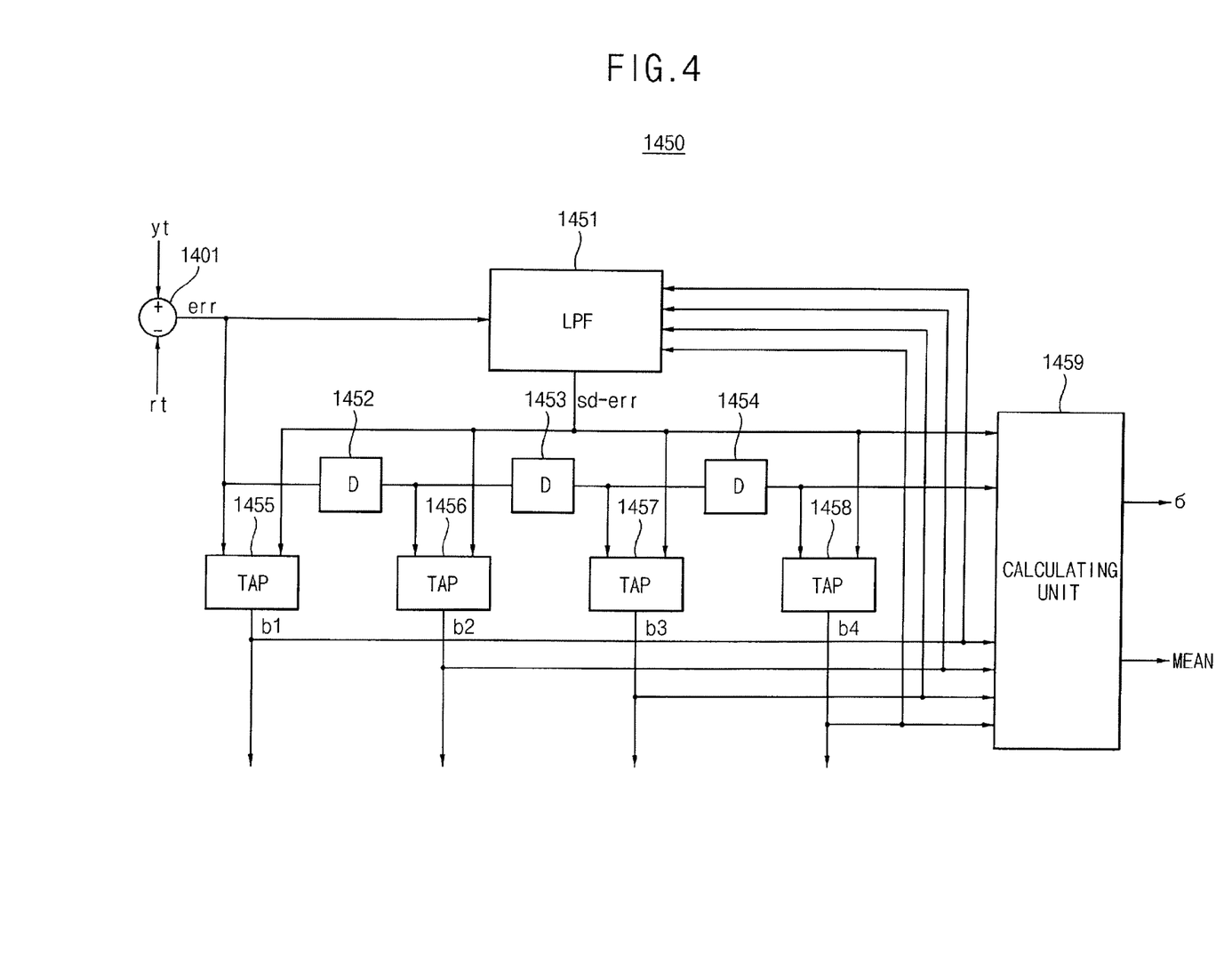
FIG. 4 is a block diagram illustrating an example of a signal-dependent adaptive engine in the read circuit of FIG. 3.

FIG. 4 is a block diagram illustrating an example of the signal-dependent adaptive engine 1450 in the read circuit 1410 of FIG. 3.

Referring to FIG. 4, the signal-dependent adaptive engine 1450 includes an adder 1401, a filter 1451, a first delay unit 1452, a second delay unit 1453, a third delay unit 1454, a first filter tap 1455, a second filter tap 1456, a third filter tap 1457, a fourth filter tap 1458, and a calculating unit 1459.

The adder 1401 subtracts the recovered data rt from the equalized data yt to generate an error signal err. The filter 1451 generates the signal-dependent error sd-err based on the error signal err and the signal-dependent coefficients b1, b2, b3 and b4.

The delay units 1452, 1453 and 1454 are cascade-coupled to each other. The first delay unit 1452 delays the error signal err by a given time, the second delay unit 1453 delays an output signal of the first delay 1452 by a given time, and the third delay unit 1454 delays an output signal of the second delay 1453 by a given time.

The filter taps 1455, 1456, 1457 and 1458 multiply the error signal err and an output signal of each of the delay units 1452, 1453 and 1454 by the signal-dependent error sd-err and accumulate the multiplied results to generate the signal-dependent coefficients b1, b2, b3 and b4. The first filter tap 1455 performs multiplication and accumulation on the error signal err and the signal-dependent error sd-err to generate the first signal-dependent coefficient b1. The second filter tap 1456 performs multiplication and accumulation on the output signal of the first delay unit 1452 and the signal-dependent error sd-err to generate the second signal-dependent coefficient b2. The third filter tap 1457 performs multiplication and accumulation on the output signal of the second delay unit 1453 and the signal-dependent error sd-err to generate the third signal-dependent coefficient b3. The fourth filter tap 1458 performs multiplication and accumulation on the output signal of the third delay unit 1454 and the signal-dependent error sd-err to generate the fourth signal-dependent coefficient b4.

The calculating unit generates the mean value MEAN of a signal-dependent error and the standard deviation a of the signal-dependent error based on the signal-dependent error sd-err and the signal-dependent coefficients b1, b2, b3 and b4.

In an example illustrated in FIG. 4, the signal-dependent adaptive engine 1450 having three delay units and four filter taps is illustrated. The signal-dependent adaptive engine according to the present general inventive concept, however, may have an arbitrary number of delay units and an arbitrary number of filter taps.

Hereinafter, the operation of the signal-dependent adaptive engine 1450 will be described.

Referring to FIG. 4, the signal-dependent adaptive engine 1450 generates the error signal err based on the output signal at of the sequence detector 1440 and the output signal yt of the equalizer 1416, and generates the signal-dependent coefficients bk, the mean value MEAN of the signal-dependent error, and the standard deviation σk of the signal-dependent error based on the equalized data yt and the recovered data rt.

A method of optimizing data using a least mean square (LMS) algorithm is well known to those of ordinary skill in the art, and is disclosed in U.S. Pat. No. 6,009,448.

The process of updating coefficients of a signal using LMS technology may be expressed by Expression 1.

$$[w_l^k]_{t+1} = [w_l^k]_t + \text{tug} \cdot \text{sd\_error}_t \cdot \text{error}_t \qquad \text{Expression 1}$$

In Expression 1, k denotes a set number of signal-dependent coefficients, and l denotes a number of the signal-dependent coefficients. Further, sd_error denotes a signal-dependent error, and error denotes a target error. Further, tug denotes a tap-update gain. A first term of the right side of Expression 1 represents a l(th) coefficient of a k(th) signal pattern at time t.

The signal-dependent error sd-err may be expressed by Expression 2, and the target error (error) may be expressed by Expression 3.

$$\text{target\_error}_t = \sum_{k=0}^{m-1} a_{t-k} h_k - y_t \qquad \text{Expression 2}$$

$$[\text{sd\_error}^k]_t = \sum_{j=0}^{v-1} e_{t-j}[w_j^k]_t \qquad \text{Expression 3}$$

In Expression 2, 'a' denotes an output signal of the sequence detector, and h denotes a target coefficient of a channel. That is, a first term of the right side of Expression 2 represents a value of an ideal input symbol that is generated using the output signal of the sequence detector. Further, $y_t$ represents an output symbol of the equalizer at a present time point.

The signal-dependent error may be expressed by Expression 2, and the target error may be expressed by Expression 3.

In Expression 3, 'e' denotes a target error illustrated in Expression 2. Referring to Expression 3, the signal-dependent error sd-err is the target error multiplied by the signal-dependent coefficient.

In a post-processor to detect an error of the sequence detector, the signal-dependent coefficient calculated using Expression 1, Expression 2 and Expression 3 may be applied to a whitening filter or a channel-matched filter that may be included in the error event filter in order to decrease the signal-dependent noise, which is non-linear noise. For example, the whitening filter or the channel-matched filter included in the error event filter having '0000' pattern may perform filtering by loading the signal-dependent coefficient of '0000' pattern.

The standard deviation $\sigma^k$ of a k(th) signal pattern may be expressed by Expression 4.

$$\sigma^k = \sqrt{\sum_{t=0}^{tod} (\text{mean}(\text{sd\_error}^k) - \text{sd\_error}_t)^2 / tod} \qquad \text{Expression 4}$$

In Expression 4, tod denotes a total number of data, and denotes a number of symbols for one data sector of, for example, an HDD system. The standard deviation $\sigma^k$ may be calculated using the signal-dependent error sd-err that is calculated using Expression 1, Expression 2 and Expression 3.

The signal-dependent BM may be calculated using Expression 1, Expression 2 and Expression 3, that update data using LMS technology, and Expression 4 that calculates the standard deviation. Then the BM may be used to calculate a maximum likelihood distance penalty (MLDP).

NPML technology is described in detail in the paper entitled, "Noise predictive maximum likelihood detection combined with parity-based post-processing," IEEE Trans. Magnetics, Vol. 37, No. 2, March 2001.

A process of calculating the BM is described in detail in the paper entitled, "The Viterbi algorithm and Markov noise memory," IEEE Trans. Information Theory, Vol. 46, No. 1, January 2000

In the read circuit, the equalized data $y_t$ that is an output signal of an equalizer may be expressed by Expression 5.

$$y_t = \sum_{k=0}^{m} x_{t-k} h_k + n_t \qquad \text{Expression 5}$$

In Expression 5, $x_t$ denotes an input data and $n_t$ denotes Gauss-Markov noise. Further, $h_k$ denotes a target coefficient of a channel. $n_t$ may be expressed by Expression 6.

$$n_k = b(x_k^{k-1})^t n_k^{k-L} + \sigma(x_k^{k-1})\omega_k \qquad \text{Expression 6}$$

In Expression 6, b denotes a signal-dependent coefficient and a denotes a signal-dependent standard deviation. A BM may be calculated using Expression 7.

$$BM = \ln \sigma^2(x_k^{k-1}) + \frac{[-b(x_k^{k-1})^T, 1]\left[y_k^{k-L}, -\sum_{k=0}^{m} x_{t-k} h_k\right]}{\sigma^2(x_k^{k-1})} \qquad \text{Expression 7}$$

In Expression 7, b denotes a signal-dependent coefficient and a denotes a signal-dependent standard deviation.

Figure 5:
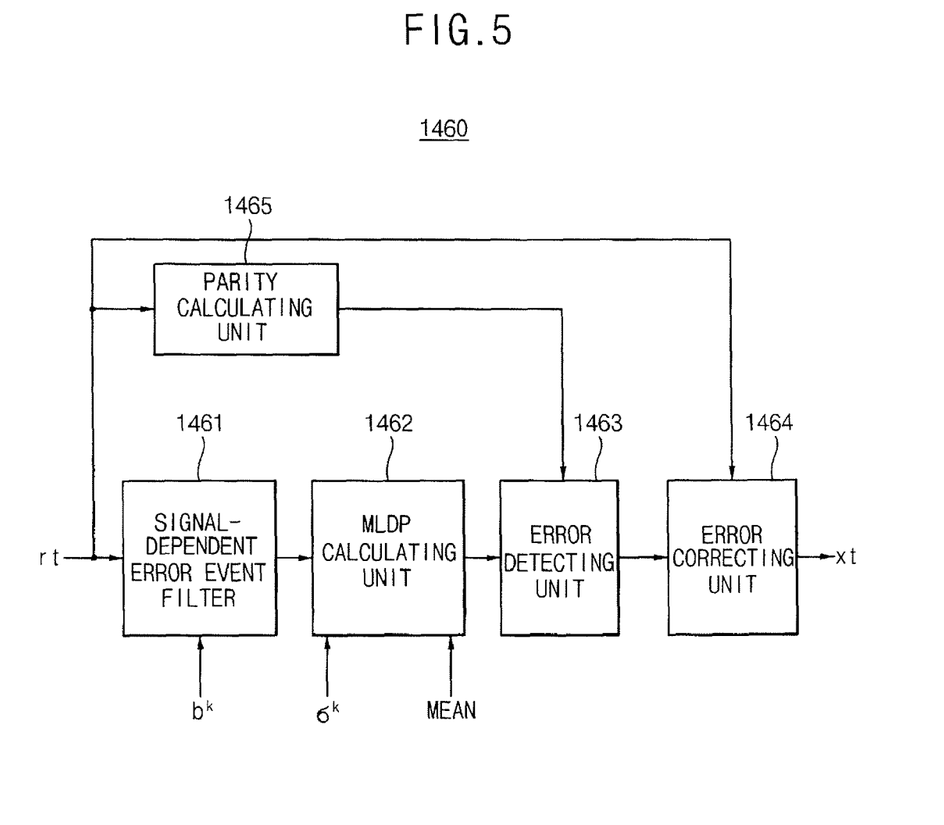
FIG. 5 is a block diagram illustrating an example of a signal-dependent post-processor in the read circuit of FIG. 3.

FIG. 5 is a block diagram illustrating an example of the signal-dependent post-processor 1460 in the read circuit 1410 of FIG. 3.

Referring to FIG. 5, the signal-dependent post-processor 1460 includes a signal-dependent error event filter 1461, an MLDP calculating unit 1462, a parity calculating unit 1465, an error detecting unit 1463 and an error correcting unit 1464.

The signal-dependent error event filter 1461 generates a signal-dependent error event based on the recovered data rt and the signal-dependent coefficients $b^k$. The MLDP calculating unit 1462 calculates an MLDP based on the signal-dependent error event, the standard deviation $\sigma^k$ of the signal-dependent error and the mean value MEAN of the signal-dependent error. The parity calculating unit 1465 calculates parity based on the recovered data rt. The error detecting unit 1463 detects an error event having a minimum value of the MLDP based on the MLDP and the parity. The error correcting unit 1464 corrects errors included in the recovered data rt based on the recovered data rt and the error event having the minimum value of the MLDP.

An MLDP may be calculated using Expression 8.

$$MLDP = \Sigma(BM(\text{data+error\_event}) - BM(\text{data})) \qquad \text{Expression 8}$$

Accordingly, an MLDP may be calculated by accumulating the BM that is calculated using Expression 7.

Figure 6:
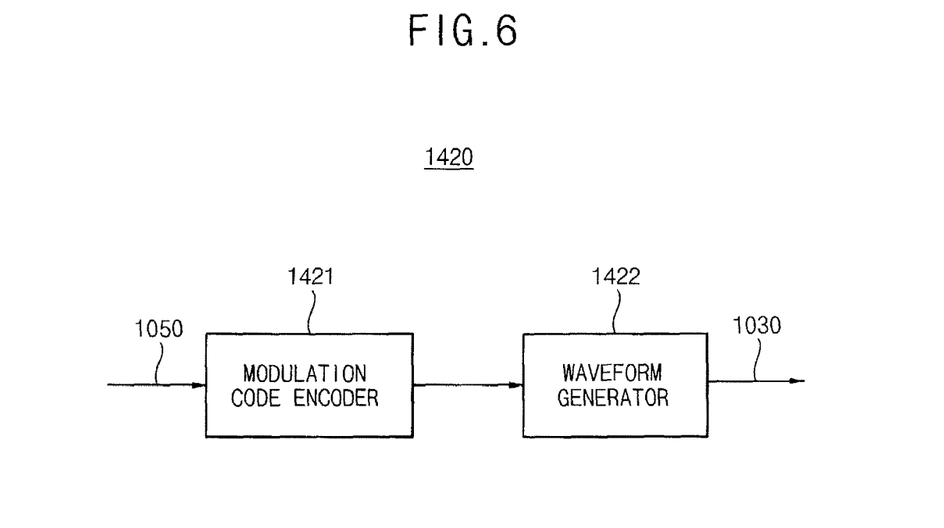
FIG. 6 is a block diagram illustrating an example of a write circuit in the read/write circuit of FIG. 2.

FIG. 6 is a block diagram illustrating an example of the write circuit 1420 in the read/write circuit 1400 of FIG. 2.

Referring to FIG. 6, the write circuit 1420 includes a modulation code encoder 1421 and a waveform generator 1422.

The modulation code encoder 1421 encodes user data received through an interface 1050. The waveform generator 1422 generates a waveform corresponding to an output signal of the modulation code encoder 1421 and provides the waveform to the pre-amplifier 1300 in FIG. 1 through an interface 1030.

According to various embodiments of a method of signal processing of a read circuit 1410 illustrated in FIG. 3, a data sequence is recovered from equalized data to generate recovered data. A plurality of signal-dependent coefficients, a mean value of a signal-dependent error, and a standard deviation of the signal-dependent error are generated based on the equalized data and the recovered data. The signal-dependent error included in the recovered data is corrected to generate first data based on the recovered data, the signal-dependent coefficients, the mean value of the signal-dependent error, and the standard deviation of the signal-dependent error. The signal-dependent coefficients, the mean value of the signal-dependent error, and the standard deviation of the signal-dependent error may be generated using an LMS engine.

Figure 7:
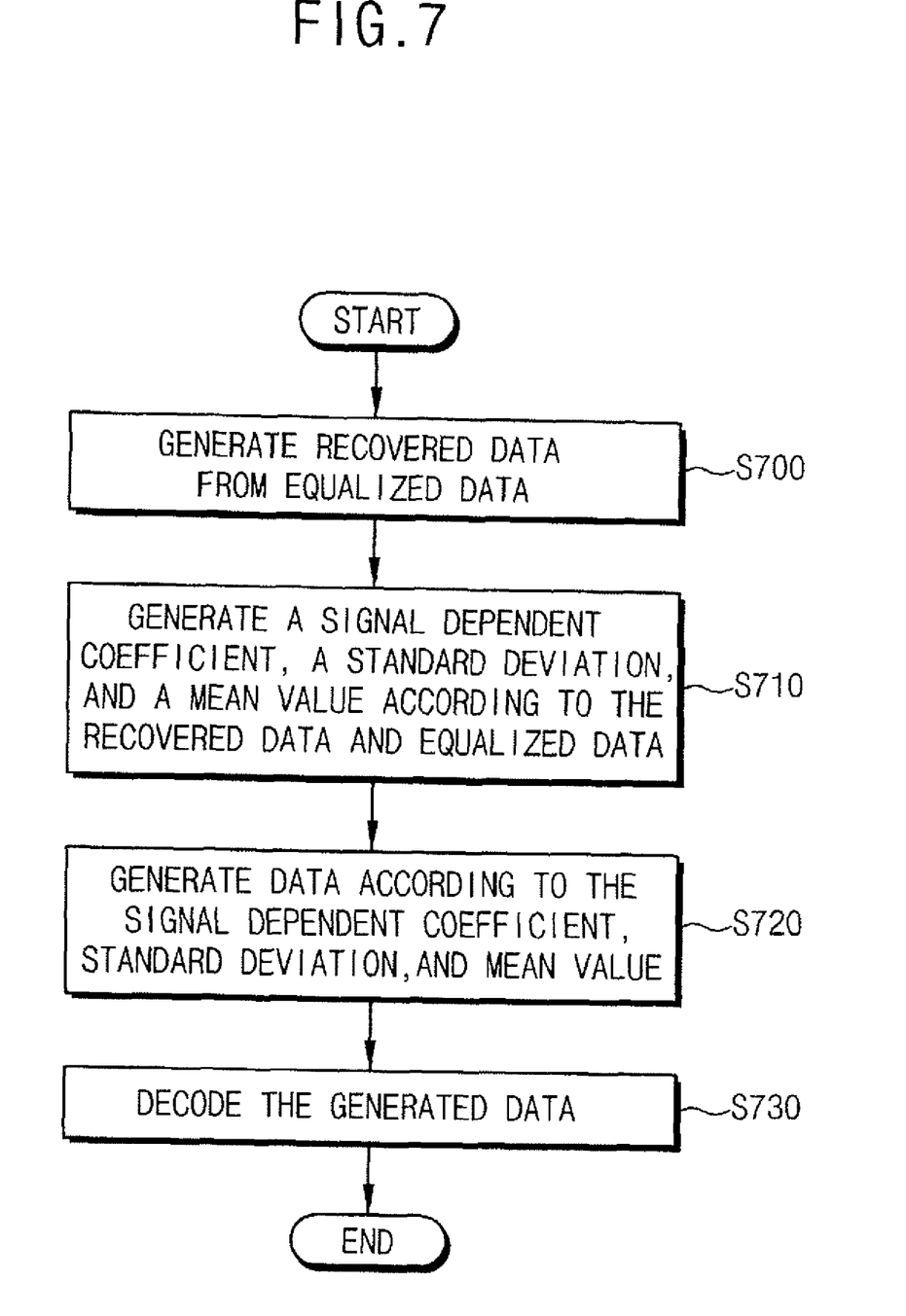
FIG. 7 is a flowchart illustrating a method of a hard disk drive system according to an example embodiment of the present general inventive concept.

FIG. 7 is a flowchart illustrating a method of a hard disk drive system according to an example embodiment of the present general inventive concept. Referring to FIG. 7, in operation 700, the hard disk drive system generates recovered data from equalized data. In operation 710, the hard disk drive system generates a signal dependent coefficient, a standard deviation and a mean value according to the recovered data and the equalized data. In operation 720, the hard disk drive system generates data according to the signal dependent coefficient, the standard deviation and the mean value. In operation 730, the hard disk drive system decodes the generated data.

The present general inventive concept can also be embodied as computer-readable codes on a computer-readable medium. The computer-readable medium can include a computer-readable recording medium and a computer-readable transmission medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

As described above, a read circuit of a disk drive system according to various embodiments the present general inventive concept may adaptively reduce signal-dependent noise using a small amount of hardware. Therefore, the read circuit of the disk drive system according to the present general inventive concept may occupy a small chip area in a semiconductor integrated circuit.

Although a few embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. A read circuit of a disk drive system, the read circuit comprising:
   a sequence detector to recover a data sequence from equalized data and to generate recovered data;
   a signal-dependent adaptive engine to generate a plurality of signal-dependent coefficients, a mean value of a signal-dependent error, and a standard deviation of the signal-dependent error based on the equalized data and the recovered data, the plurality of signal dependent coefficients being adaptively generated by performing multiplication and accumulation on the signal-dependent error and an error signal; and
   a signal-dependent post-processor to correct the signal-dependent error included in the recovered data and to generate first data based on the recovered data, the signal-dependent coefficients, the mean value of the signal-dependent error, and the standard deviation of the signal-dependent error.

2. The read circuit of claim 1, wherein the signal-dependent adaptive engine generates the signal-dependent coefficients, the mean value of the signal-dependent error, and the standard deviation of the signal-dependent error using a least mean square (LMS) engine.

3. The read circuit of claim 1, further comprising:
   an analog front end to amplify, filter, and buffer an output signal of a pre-amplifier;
   an analog-to-digital (ADC) converter to sample an output signal of the analog front end and convert the sampled signal into a first signal having a digital form; and
   a digital front end to perform a partial-response pulse shaping on the first signal to generate the equalized data.

4. The read circuit of claim 3, wherein the digital front end comprises:
   an equalizer.

5. The read circuit of claim 1, wherein the signal-dependent adaptive engine comprises:
   an adder to subtract the recovered data from the equalized data and to generate the error signal;
   a filter to generate the signal-dependent error based on the error signal and the signal-dependent coefficients;
   a plurality of delay units cascade-coupled to each other, and to delay the error signal; and
   a plurality of filter taps to multiply the error signal and an output signal of each of the delay units by the signal-dependent error and accumulate the multiplied results to generate the signal-dependent coefficients.

6. The read circuit of claim 5, wherein the signal-dependent adaptive engine further comprises:
   a calculating unit to generate the mean value of a signal-dependent error and the standard deviation of the signal-dependent error based on the signal-dependent error and the signal-dependent coefficients.

7. The read circuit of claim 1, wherein the signal-dependent post-processor comprises:
   a signal-dependent error event filter to generate a signal-dependent error event based on the recovered data and the signal-dependent coefficients;
   a maximum likelihood distance penalty (MLDP) calculating unit to calculate an MLDP based on the signal-dependent error event, the standard deviation of the signal-dependent error and the mean value of the signal-dependent error;
   a parity calculating unit to calculate a parity based on the recovered data;
   an error detecting unit to detect an error event having a minimum value of the MLDP based on the MLDP and the parity; and
   an error correcting unit to correct errors included in the recovered data based on the recovered data and the error event having the minimum value of the MLDP.

8. An adaptive post-processor, comprising:
   a signal-dependent adaptive engine to generate a plurality of signal-dependent coefficients, a mean value of a signal-dependent error, and a standard deviation of the signal-dependent error based on equalized data and recovered data, the plurality of signal dependent coefficients being adaptively generated by performing multiplication and accumulation on the signal-dependent error and an error signal; and
   a signal-dependent post-processor to correct the signal-dependent error included in the recovered data to generate error-corrected data based on the recovered data, the signal-dependent coefficients, the mean value of the signal-dependent error, and the standard deviation of the signal-dependent error.

9. The adaptive post-processor of claim 8, wherein the signal-dependent adaptive engine generates the signal-dependent coefficients, the mean value of the signal-dependent error, and the standard deviation of the signal-dependent error using an LMS engine.

10. An error correcting circuit, comprising:
a sequence detector to recover a data sequence from equalized data to generate recovered data;
a signal-dependent adaptive engine to generate a plurality of signal-dependent coefficients, a mean value of a signal-dependent error, and a standard deviation of the signal-dependent error based on the equalized data and the recovered data, the plurality of signal dependent coefficients being adaptively generated by performing multiplication and accumulation on the signal-dependent error and an error signal; and
a signal-dependent post-processor to correct the signal-dependent error included in the recovered data to generate first data based on the recovered data, the signal-dependent coefficients, the mean value of the signal-dependent error, and the standard deviation of the signal-dependent error.

11. The error correcting circuit of claim 10, wherein the signal-dependent adaptive engine generates the signal-dependent coefficients, the mean value of the signal-dependent error, and the standard deviation of the signal-dependent error using an LMS engine.

12. A method of signal processing of a read circuit, the method comprising:
recovering a data sequence from equalized data to generate recovered data;
generating a plurality of signal-dependent coefficients, a mean value of a signal-dependent error, and a standard deviation of the signal-dependent error based on the equalized data and the recovered data, the plurality of signal dependent coefficients being adaptively generated by performing multiplication and accumulation on the signal-dependent error and an error signal; and
correcting the signal-dependent error included in the recovered data to generate first data based on the recovered data, the signal-dependent coefficients, the mean value of the signal-dependent error, and the standard deviation of the signal-dependent error,
wherein a control module performs at least one of the recovering and generating and correcting operations to signal process the read circuit.

13. The method of claim 12, wherein the signal-dependent coefficients, the mean value of the signal-dependent error, and the standard deviation of the signal-dependent error are generated using an LMS engine controlled by the control module.

14. A disk drive system, comprising:
one or more magnetic platters;
a read/write head unit to read data from and write data to the one or more platters; and
a read/write unit to receive data from and provide data to the read/write head unit in a manner that signal-dependent noise corresponding to one or more media characteristics is adaptively reduced, the read/write unit comprising:

a signal-dependent adaptive engine to generate one or more signal-dependent coefficients, a mean value of a signal-dependent error and a standard deviation of a signal-dependent error based on recovered data, the one or more signal-dependent coefficients being generated by performing multiplication and accumulation on the signal-dependent error and an error signal; and
a signal-dependent post-processor coupled to the signal-dependent adaptive engine to correct the signal-dependent error in the recovered data.

15. The disk drive system of claim 14, wherein the signal-dependent post-processor corrects the signal-dependent error included in the recovered data to generate first data based on at least one of the recovered data, the one or more signal-dependent coefficients, the mean value of the signal-dependent error, and the standard deviation of the signal-dependent error.

16. A method of error correcting in a disk drive system, the method comprising:
generating one or more signal-dependent coefficients, a mean value of a signal-dependent error and a standard deviation of a signal-dependent error based on recovered data, the one or more signal-dependent coefficients being generated by performing multiplication and accumulation on the signal-dependent error and an error signal; and
correcting the signal-dependent error in the recovered data,
wherein a control module generates at least one of the one or more signal-dependent coefficients, the mean value of a signal-dependent error and the standard deviation to error correct the disk drive system.

17. A non-transitory computer-readable recording medium having embodied thereon a computer program to execute a method, wherein the method comprises:
recovering a data sequence from equalized data to generate recovered data;
generating a plurality of signal-dependent coefficients, a mean value of a signal-dependent error, and a standard deviation of the signal-dependent error based on the equalized data and the recovered data, the one or more signal-dependent coefficients being generated by performing multiplication and accumulation on the signal-dependent error and an error signal; and
correcting the signal-dependent error included in the recovered data to generate first data based on the recovered data, the signal-dependent coefficients, the mean value of the signal-dependent error, and the standard deviation of the signal-dependent error.

18. A disk drive system, comprising:
a read circuit to recover data of a data sequence to generate recovered data, to generate a combination of a signal dependent coefficient, a mean value, a standard deviation according to the recovered data and the data, and to correct a signal dependent error of the data and the recovered data according to the combination of the signal dependent coefficient, mean value, and standard deviation, the signal dependent coefficient being adaptively generated by performing multiplication and accumulation on the signal dependent error and an error signal.

* * * * *